(12) United States Patent
Hong et al.

(10) Patent No.: US 9,420,804 B2
(45) Date of Patent: Aug. 23, 2016

(54) SHELF STABLE SAUCE FOR ACIDIFIED STARCH

(75) Inventors: Yeong-Ching Albert Hong, Kildeer, IL (US); Lynell Morales, Chicago, IL (US); John Pasch, Lake Zurich, IL (US)

(73) Assignee: Kraft Foods Group Brands LLC, Chicago, IL (US)

( * ) Notice: Subject to any disclaimer, the term of this patent is extended or adjusted under 35 U.S.C. 154(b) by 2156 days.

(21) Appl. No.: 12/246,032

(22) Filed: Oct. 6, 2008

(65) Prior Publication Data

US 2010/0086665 A1    Apr. 8, 2010

(51) Int. Cl.
| | | |
|---|---|---|
| A23L 1/40 | (2006.01) |
| A23L 1/238 | (2006.01) |
| B65D 85/76 | (2006.01) |
| A21D 4/00 | (2006.01) |
| A23K 3/00 | (2006.01) |
| A23L 3/34 | (2006.01) |
| A23B 7/10 | (2006.01) |
| B65B 55/00 | (2006.01) |
| A23C 19/082 | (2006.01) |
| A23C 19/00 | (2006.01) |
| A23C 19/09 | (2006.01) |
| A23L 1/39 | (2006.01) |

(52) U.S. Cl.
CPC ............. *A23C 19/0904* (2013.01); *A23L 1/39* (2013.01); *A23C 2270/15* (2013.01)

(58) Field of Classification Search
CPC ... A23C 19/0904; A23C 2270/15; A23L 1/39
USPC ......... 426/589, 130, 106, 321, 324, 582, 334, 426/580
See application file for complete search history.

(56) References Cited

U.S. PATENT DOCUMENTS

| | | | |
|---|---|---|---|
| 4,497,834 A * | 2/1985 | Barta .......................... 426/42 |
| 4,568,555 A | 2/1986 | Spanier |
| 4,749,584 A | 6/1988 | Wirchansky et al. |
| 4,828,852 A | 5/1989 | Hsu et al. |
| 4,840,806 A | 6/1989 | Hyldon et al. |
| 5,057,330 A | 10/1991 | Lee et al. |
| 5,304,387 A | 4/1994 | Hine |
| 5,320,860 A | 6/1994 | Duval et al. |
| 5,433,964 A | 7/1995 | Norman et al. |
| 5,562,938 A | 10/1996 | Lee et al. |
| 5,599,573 A | 2/1997 | Barnes et al. |
| 5,755,880 A | 5/1998 | Norman et al. |
| 5,759,607 A | 6/1998 | Chawan et al. |
| 5,817,356 A | 10/1998 | Gum et al. |
| 6,022,575 A | 2/2000 | Lee et al. |
| 6,203,840 B1 | 3/2001 | Meyer et al. |
| 6,428,835 B1 | 8/2002 | Debbouz et al. |
| 6,576,279 B1 | 6/2003 | O'Rourke et al. |
| 6,596,331 B1 | 7/2003 | Nobuyasu et al. |
| 7,189,423 B2 | 3/2007 | Irwin et al. |
| 2002/0054939 A1 * | 5/2002 | Irwin et al. ................ 426/120 |
| 2005/0238785 A1 * | 10/2005 | Shukla et al. .............. 426/589 |
| 2009/0186129 A1 * | 7/2009 | Gamay et al. ............... 426/87 |

FOREIGN PATENT DOCUMENTS

| | | |
|---|---|---|
| EP | 0940090 | 9/1999 |
| JP | 59074958 | 4/1984 |
| JP | 59232079 | 12/1984 |
| JP | 60078551 | 5/1985 |
| JP | 61216651 | 9/1986 |
| JP | 61257151 | 11/1986 |
| JP | 07250629 | 10/1995 |
| WO | 0070971 | 11/2000 |

* cited by examiner

*Primary Examiner* — Lien T Tran
*Assistant Examiner* — Tynesha McClain-Coleman
(74) *Attorney, Agent, or Firm* — Fitch, Even, Tabin & Flannery LLP

(57) ABSTRACT

A shelf-stable acidified starch and cheese sauce meal is provided. In one aspect, the meal includes an acidified starch component having a pH of about 4.6 or below and a separate cheese-based sauce component having a pH between about 5.7 and about 6.2. The sauce component is to be combined with the acidified starch component when the meal is ready to be consumed. In another aspect, a buffering composition is blended into the separate cheese-based sauce component and includes blends of dibasic phosphate salts, monobasic phosphate salts, and an edible acid where the cheese-based sauce component has a total dry weight of phosphate salt between about 3 and about 5 percent.

24 Claims, No Drawings

SHELF STABLE SAUCE FOR ACIDIFIED STARCH

FIELD

The field relates to shelf stable sauces for use with an acidified starch and, in particular, shelf-stable cheese-based sauces for use with acidified starch.

BACKGROUND

Various food preservation methods are commonly used in order to extend the shelf life of food items. For example, food preservation methods may include refrigeration, high temperature treatment and hermetically sealed containers, water activity (Aw) below a certain level, or pasteurization and acidification to a predetermined pH. Depending on the food type, each food preservation method may have varying results.

Starch products, such as rice, potatoes, and pasta, can use acidification as the preservation method to make them shelf stable. Often, an edible acid, such as lactic or propionic acid, may be introduced to the starch product, thereby lowering the pH of the starch product to a level below about 4.6 or, in some cases, below about 4.2 to render the starch shelf stable. However, the result of acidifying these starchy foods tends to impart undesired organoleptic qualities to the food. In particular, acidified starch products often possess undesirable sour flavor notes attributable to the low pH.

A cheese sauce or cheese-based sauce, on the other hand, often utilizes a preservation system based on water activity, various emulsifying and buffering salts, and a moderate pH between about 5.3 to about 6.2. Shelf-stable cheese sauces, therefore, generally have a higher pH then the acidified starches. Typically, a cheese sauce will include an amount of disodium phosphate that is less than about 3 percent anhydrous by weight. Disodium phosphate is generally used to aid in the manufacture of cheese and cheese sauces by solubilizing protein and facilitating emulsion of fat. Additional disodium phosphate above 3 percent, which is alkaline, tends to increase the pH of the sauce and expected to result in a soapy or metallic flavor.

Given the different preservation systems of cheese sauces and acidified starches, combining the two as a single, shelf stable sauce and starch meal (i.e., sauce and pasta) can be difficult. The different preservation systems of these food components are generally not compatible. When combined, the higher pH of the sauce will tend to increase the pH of the pasta or other acidified starch, which may then destabilize the shelf-stability of the pasta component.

Therefore, it is common to package the acidified food component separate from the sauce component so that each component may be packaged using its desired preservation method. The consumer then mixes the two components together when they are ready to be consumed. When the prior cheese-based sauce component is combined with the acidified pasta component by a consumer, the combined meal can taste too sour generally due to the lower pH of the pasta component, and the flavors achieved with such a combined meal are generally not compatible. Such incompatible flavors tend not to be a problem with meals using acidic sauces, such as tomato-based sauces, because the acidic sauce is more compatible with the acidified starch and tends to mask the undesirable flavor profiles associated with the acidified starch.

Attempts to formulate an acidified starch and cheese-based sauce combination in a shelf stable product that can be combined by a consumer all have various shortcomings that render the meal undesirable for either stability and/or organoleptic reasons. In one approach, the acidified starch can be combined with a neutralizing agent that remains isolated from the acidified food during packaging, but is combined with the acidified starch when the meal is considered ready to eat. One such neutralizing agent is an encapsulated sodium bicarbonate that neutralizes the acid in the starch and results in the creation of salt and carbonic acid, which subsequently breaks down into carbon dioxide and water. Alternatively, the neutralizing agent can be isolated from the starch by being added to a sauce. However, because neutralizing agents such as sodium bicarbonate can also react with both acids and bases, any sauce to which the sodium bicarbonate may be combined with generally needs a pH comparable to sodium bicarbonate; otherwise, the sodium bicarbonate could react with the sauce to form undesirable salts, water and/or carbon dioxide. Such reactions may affect the organoleptic qualities of the sauce and may adversely affect the packaging of the sauce.

U.S. Pat. No. 7,189,423 to Irwin et al. describes the addition of increased amounts of edible alkaline or base substances to a sauce for later combination with acidified starch products. The resultant sauce, therefore, has an increased pH between about 6.2 and about 7.2. The sauces of Irwin, therefore, when combined with the acidified starch, have a sufficiently high pH to generally increase the pH of the starch to levels that exhibit more traditional flavor notes. However, the increased pH of Irwin's sauce, on the other hand, is outside the pH range generally desired for shelf-stable cheeses and may render the preservation system less effective and/or negatively impact the organoleptic qualities of the sauce because the pH is increased beyond the expected normal ranges (i.e., about 5.3 to about 6.2) for a traditional cheese based sauce.

SUMMARY

A shelf-stable acidified starch and cheese sauce meal is provided. In one aspect, the meal includes an acidified starch component having a pH of about 4.6 or below and a separate cheese-based sauce component having a pH between about 5.7 and about 6.2 and, preferably, about 5.8 and about 6.1. The sauce component is to be combined with the acidified starch component when the meal is ready to be consumed. In another aspect, a buffering composition is blended into the separate cheese-based sauce component. The buffering composition includes blends of dibasic phosphate salts, monobasic phosphate salts, and an edible acid where the cheese-based sauce component has a dry weight of total phosphate salts between about 3 and about 5 percent. Dibasic phosphate salts include, but are not limited to, disodium phosphate, dipotassium phosphate, and the like, and mixtures thereof. Monobasic phosphate salts include, but are not limited to, monosodium phosphate, monopotassium phosphate, and the like, and mixtures thereof.

Preferably, the buffering composition includes an effective amount of the disodium phosphate sufficient to increase the pH of the acidified starch component when the separate cheese-based sauce component is combined with the acidified starch component as the meal is ready to be consumed. In this manner, the acidic nature of the starch component is at least partially neutralized by the disodium phosphate so that it generally does not exhibit sour notes. At the same time, the buffering composition also includes an effective amount of the monosodium phosphate and edible acid so that the pH of the separate cheese-based sauce component is between about 5.7 and about 6.2 and, preferably, about 5.8 to about 6.1 when separate from the acidified starch component so that the desired preservation system of the cheese-based sauce component is maintained prior to formation of the combined meal.

DETAILED DESCRIPTION OF THE PREFERRED EMBODIMENTS

A shelf-stable meal including an acidified starch component and cheese-based sauce component, in which the starch and sauce components are separated until meal preparation is provided. The separated components employ distinct preservation systems suited for the individual starch and cheese sauce components when they are kept separate. The meal also provides a pleasing taste in the final combined meal when the sauce is added to the starch prior to consumption. In one aspect, the meal includes the cheese-based sauce component having a buffering composition effective to maintain the pH of the sauce in a range for its preservation system when separate from the acidified starch component, and at the same time effective to at least partially neutralize the acidified starch component when the sauce is added thereto to provide a consumer expected and pleasing flavor when combined with the acidified starch component. As used herein, shelf-stable or a shelf-stable meal generally refers to food items that can be stored at ambient conditions or about 70 to about 75° F. for at least about 9 months without resulting in spoilage or microbial growth.

In one aspect, the acidified starch component is generally any starch-based food product having a preservation system employing a lowered pH. For example, the acidified starch component generally has a pH of less than about 4.6, and, preferably, less than about 4.2 in order to maintain the starch in a shelf stable form. Examples of preferred acidified starch products include but are not limited to pasta, rice, and potato products. As described in the background, while the reduced pH allows the acidified starch product to be shelf-stable, the acidified starch products at such low pH generally tend to exhibit undesirable flavor characteristics, such as sour notes, due to the lowered pH.

In another aspect, the cheese-based sauce component is any cheese-based sauce that is commonly used with pasta, rice, and/or potatoes. For example, the cheese-based sauce component may be, but not limited to, an Alfredo sauce, cheddar sauce, white cheese sauces, and the like. The cheese sauce has a preservation system which includes a pH between about 5.7 to about 6.2 (preferably, about 5.8 to about 6.1) in order to preserve the organoleptic qualities of the cheese sauce. Further, the preservation system of the cheese may include the addition of sorbic acid and various salts, such as sodium chloride and disodium phosphate. The cheese sauce also maintains a moisture and fat content suitable for shelf preservation and stability.

As noted in the background, a cheese sauce having a pH between about 5.3 and about 6.2 is generally designed for its preferred preservation system, but such pH range tends to be inadequate to raise the pH of the acidified starch component when the sauce is combined therewith so as to reduce any undesirable flavor notes in the starch due to its low pH. Therefore, the cheese-based sauces herein include a buffering composition that both maintains the pH of the sauce in the desired ranges (about 5.7 to about 6.2 and, preferably, about 5.8 to about 6.1) when separate from the acidified starch in order to maintain the cheese sauce's desired preservation system, but at the same time also provide the sauce with the capacity to at least partially neutralize the acidified start component when the sauce is added thereto to reduce and, preferably, eliminate any sour notes in the starch.

By one approach, the buffering composition includes a blend of high pH components and low pH components to both maintain the pH in its desired range and partially neutralize the starch when combined therewith. The buffering composition includes sufficient amounts of higher pH components effective to increase the pH of the acidified starch component, when the sauce is combined with the starch, so that the starch exhibits expected flavors and smells. At the same time, the buffering composition also includes sufficient amounts of the lower pH components effective to maintain the overall pH of the sauce in the desired ranges between about 5.7 and about 6.2 and, preferably, between about 5.8 and about 6.1 when separate from the starch.

Preferably, the buffering composition can include buffering components including edible acids (such as lactic acid and the like) and/or salts (such as phosphates and citrates and the like). In one embodiment, the buffering composition includes a combination of disodium phosphate (a relatively high pH component with a pH of about 8.0), monosodium phosphate (a relatively low pH component with a pH between about 2 to about 3), and lactic acid (an acidulant). Disodium phosphate and monosodium phosphate, while including a phosphate salt component, also include a moisture component. Disodium phosphate is a dihydrate having a dry weight equal to about 80 percent of hydrated disodium phosphate, while monosodium phosphate is a monohydrate having a dry weight equal to about 87 percent of the hydrated monosodium phosphate.

In one embodiment, the cheese-based sauce components includes a buffering composition including dry phosphate salts in a total amount ranging from about 3.0 to about 5.0 percent by weight. Amounts above this range will tend to result in a soapy, metallic taste in the final product, and amounts below this range are generally not sufficient to provide a buffering capacity to the sauce. In one embodiment, the cheese sauce includes more disodium phosphate by dry weight percentage than monosodium phosphate. For example, the cheese-based sauce may include (dry weight) about 3 to about 4.7 percent of the disodium phosphate and about 0.3 to about 2.0 percent of the monosodium phosphate (preferably, about 0.5 to about 2.0 percent and, most preferably about 1.0 percent. In a preferred embodiment, the total amount of phosphate salt is from about 3.5 to about 4.8 percent (dry basis). Lactic acid is blended into the buffering composition to reach the final target pH of the sauce. In some cases, at least about 0.5 percent lactic acid may be added.

Carbohydrates, such as corn syrup, maltodextrin, and the like may also be added to the cheese sauce as a bulking agent to balance out the formulation. In general, the amount of such bulking agents can be varied as needed depending on the level of phosphate salts. For instance, as the amount of phosphate salts increase, the amount of such bulking agents can be decreased.

As a result, the shelf stable cheese based sauce with the buffering compositions described herein results in a sauce maintaining its desired preservation system having a pH from about 5.7 to about 6.2 (preferably, about 5.8 to about 6.1) that generally does not affect the shelf stability of the cheese sauce when it is separate from the starch component in the meal. At the same time, the buffering composition in the cheese sauce also enables the sauce to partially neutralize the acidified starch component when the sauce is added thereto by the consumer when preparing the meal. When the cheese-based sauce component with the buffering composition is combined with the acidified starch component, the buffering composition raises the pH of the acidified starch to provide favorable organoleptic qualities. For example, the buffering composition of the sauce is effective to increase the pH of the combined meal to about 5.4 to about 5.7. At the same time, the pH of the cheese sauce generally remains relatively unchanged from the combination, which in some cases can generally remain between about 5.7 and 6.2.

The cheese-based sauce component with buffering composition may also be used with non-acidified food products, such as non-acidified starch products. Just as when the cheese sauce is combined with acidified starch products, the combination of the cheese sauce and non-acidified starch products does not result in a significant change in pH of the cheese sauce so as to negatively affect the organoleptic qualities of the cheese sauce. The shelf-stable, cheese-based sauce component, therefore, is capable of being combined with acidified and non-acidified starch products without the combined food product having undesirable flavor characteristics.

Advantages and embodiments of the meal products described herein are further illustrated by the following examples; however, the particular conditions, processing schemes, materials, and amounts thereof recited in these examples, as well as other conditions and details, should not be construed to unduly limit this method. All percentages are by weight unless otherwise indicated.

EXAMPLE

Table 1 below compares an Alfredo cheese sauce in a control cheese sauce formulation to a cheese sauce formulation having a buffering composition as described herein. The control cheese sauce had a pH of about 5.8 and showed good flavor profiles when combined with a non-acidified pasta, but when combined with an acidified pasta having a pH of about 4.0, the flavor of the combined meal was sour and bitter.

The cheese sauce having the buffering composition had a pH of about 5.9 and was prepared in the same manner as the control, but resulted in a pleasing tasting meal when combined with both a non-acidified and an acidified pasta having a pH of about 4.0. Table 1 below provides a summary of the comparative and cheese sauce with the buffering composition.

TABLE 1

| Formulation | Control Cheese Sauce | Buffering Cheese Sauce |
| --- | --- | --- |
| Cheese | 25 | 25 |
| Anhydrous Milk Fat | 3.9 | 3.9 |
| Sorbic Acid | 0.2 | 0.2 |
| Water | 41.8 | 41.7 |
| Oil | 9.0 | 9.0 |
| Whey Powder | 2.9 | 2.9 |
| Whey Protein Concentrate | 8.4 | 8.4 |
| Maltodextrin (DE-10) | 1.7 | 0.1 |
| Milk Protein Concentrate | 1.0 | 1.0 |
| Sodium Alginate | 0.2 | 0.2 |
| Sodium Chloride | 1.4 | 0.9 |
| Seasonings and Flavors | 1.0 | 1.0 |
| Disodium Phosphate* | 3.1 (2.5) | 4.3 (3.4) |
| Monosodium Phosphate* | 0 | 1.1 (1.0) |
| Lactic Acid | 0.5 | 0.5 |
| pH before combining with acidified starch | 5.8 | 5.9 |
| Total Phosphate Salt* | 3.1 (2.5) | 5.4 (4.4) |
| Taste of Combined Sauce and Acidified Pasta | sour and bitter | pleasant and expected |

*Monosodium phosphate and disodium phosphate amounts include anhydrous (dry) percentages in parentheses.

It will be understood that various changes in the details, materials, and arrangements of the process, formulations, and ingredients thereof, which have been herein described and illustrated in order to explain the nature of the products herein, may be made by those skilled in the art within the principle and scope of the embodied method as expressed in the appended claims.

What is claimed is:

1. A shelf-stable acidified starch and cheese sauce meal comprising:
    an acidified starch component having a pH of about 4.6 or below;
    a separate cheese-based sauce component to be combined with the acidified starch component when the meal is ready to be consumed, the separate cheese-based sauce component having a pH between about 5.7 and about 6.2;
    a buffering composition blended into the separate cheese-based sauce component and including a dibasic phosphate salt, a monobasic phosphate salt, and an edible acid;
    a total dry weight of phosphate salt between about 3 and about 5 percent in the cheese-based sauce component;
    an amount of the dibasic phosphate salt in the buffering composition sufficient to increase the pH of the acidified starch component when the separate cheese-based sauce component is combined therewith when the meal is ready to be consumed;
    an amount of the monobasic phosphate salt and the edible acid in the buffering composition so that the pH of the separate cheese-based sauce component is between about 5.7 and about 6.2 when separate from the acidified starch component; and
    wherein the cheese-based sauce component includes about 3 to about 4.7 percent of the dibasic phosphate salt on a dry basis.

2. The shelf-stable acidified starch and cheese sauce meal of claim 1, wherein the amount of dibasic phosphate salt is effective to increase the pH of the combined meal to about 5.4 to about 5.7 when the cheese-based sauce component is combined with the acidified starch component when the meal is ready to be consumed.

3. The shelf-stable acidified starch and cheese sauce meal of claim 1, wherein the cheese-based sauce component includes about 0.3 to about 2.0 percent of the monobasic phosphate salt on a dry basis.

4. The shelf-stable acidified starch and cheese sauce meal of claim 1, wherein the pH of the separate cheese-based sauce component is about 5.8 to about 6.1.

5. The shelf-stable acidified starch and cheese sauce meal of claim 1, wherein the pH of the cheese-based sauce component is about 5.8 to about 6.1 after being combined with the acidified starch component.

6. The shelf-stable acidified starch and cheese sauce meal of claim 1, wherein the dibasic phosphate salt includes disodium phosphate, dipotassium phosphate, and mixtures thereof.

7. The shelf-stable acidified starch and cheese sauce meal of claim 1, wherein the monobasic phosphate salt includes monosodium phosphate, monopotassium phosphate, and mixtures thereof.

8. The shelf-stable acidified starch and cheese sauce meal of claim 1, wherein the edible acid is lactic acid.

9. The shelf-stable acidified starch and cheese sauce meal of claim 1, wherein the acidified starch component is pasta.

10. The shelf-stable acidified starch and cheese sauce meal of claim 1, wherein the cheese-based sauce component is an Alfredo-based cheese sauce.

11. A shelf-stable cheese-based sauce for use on acidified foods, the shelf-stable cheese-based sauce comprising:
   a cheese base;
   a buffering composition blended into the cheese base and including dibasic phosphate salt, monobasic phosphate salt, and an edible acid;
   a total dry weight of phosphate salt between about 3 and about 5 percent;
   about 3 to about 4.7 percent dibasic phosphate salt and about 0.3 to about 2 percent monobasic phosphate salt so that the shelf-stable cheese based sauce has a pH between about 5.7 and about 6.2; and
   wherein the buffering composition is effective to maintain a pH of a combined sauce and acidified food between about 5.4 and about 5.7 when blended with acidified foods.

12. The cheese based sauce of claim 11, wherein the sauce includes at least about 0.5 percent edible acid.

13. The cheese-based sauce of claim 11, wherein the dibasic phosphate salt includes disodium phosphate, dipotassium phosphate, and mixtures thereof.

14. The cheese-based sauce of claim 11, wherein the monobasic phosphate salt includes monosodium phosphate, monopotassium phosphate, and mixtures thereof.

15. The cheese-based sauce of claim 11, wherein the edible acid is lactic acid.

16. The cheese-based sauce of claim 11, wherein the cheese base is an Alfredo-based cheese sauce.

17. A shelf-stable acidified starch and cheese sauce meal comprising:
   an acidified starch component having a pH of about 4.6 or below;
   a separate cheese-based sauce component to be combined with the acidified starch component when the meal is ready to be consumed;
   a buffering composition blended into the separate cheese-based sauce component and including a dibasic phosphate salt, a monobasic phosphate salt, and an edible acid;
   a total dry weight of phosphate salt between about 3 and about 5 percent in the cheese-based sauce component;
   an amount of the dibasic phosphate salt in the buffering composition sufficient to increase the pH of the acidified starch component when the separate cheese-based sauce component is combined therewith when the meal is ready to be consumed;
   an amount of the monobasic phosphate salt and the edible acid in the separate cheese-based sauce component so that the pH of the separate cheese-based sauce component is between about 5.7 and about 6.2 when separate from the acidified starch component;
   wherein the amount of dibasic phosphate salt is effective to increase the pH of the combined meal to about 5.4 to about 5.7 when the cheese-based sauce component is combined with the acidified starch component when the meal is ready to be consumed;
   wherein the separate cheese-based sauce component includes about 3 to about 4.7 percent of the dibasic phosphate salt on a dry basis; and
   wherein the separate cheese-based sauce component includes about 0.3 to about 2.0 percent of the monobasic phosphate salt on a dry basis.

18. The shelf-stable acidified starch and cheese sauce meal of claim 17, wherein the pH of the separate cheese-based sauce component is about 5.8 to about 6.1.

19. The shelf-stable acidified starch and cheese sauce meal of claim 17, wherein the pH of the cheese-based sauce component is about 5.8 to about 6.1 after being combined with the acidified starch component.

20. The shelf-stable acidified starch and cheese sauce meal of claim 17, wherein the dibasic phosphate salt includes disodium phosphate, dipotassium phosphate, and mixtures thereof.

21. The shelf-stable acidified starch and cheese sauce meal of claim 17, wherein the monobasic phosphate salt includes monosodium phosphate, monopotassium phosphate, and mixtures thereof.

22. The shelf-stable acidified starch and cheese sauce meal of claim 17, wherein the edible acid is lactic acid.

23. The shelf-stable acidified starch and cheese sauce meal of claim 17, wherein the acidified starch component is pasta.

24. The shelf-stable acidified starch and cheese sauce meal of claim 17, wherein the cheese-based sauce component is an Alfredo-based cheese sauce.

* * * * *